US009059984B2

(12) United States Patent
Brown et al.

(10) Patent No.: US 9,059,984 B2
(45) Date of Patent: *Jun. 16, 2015

(54) AUTHENTICATING AN AUXILIARY DEVICE FROM A PORTABLE ELECTRONIC DEVICE (71) Applicant: BlackBerry Limited, Waterloo (CA)

(72) Inventors: Michael Stephen Brown, Kitchener (CA); Herbert Anthony Little, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/070,960

(22) Filed: Nov. 4, 2013

(65) Prior Publication Data

US 2014/0068741 A1 Mar. 6, 2014

Related U.S. Application Data (63) Continuation of application No. 13/243,683, filed on Sep. 23, 2011, now Pat. No. 8,578,461.

(60) Provisional application No. 61/386,689, filed on Sep. 27, 2010.

(51) Int. Cl.
H04L 29/06 (2006.01)
H04W 12/06 (2009.01)
(Continued)

(52) U.S. Cl.
CPC ............. H04L 63/0807 (2013.01); *H04L 63/10* (2013.01); H04L 63/20 (2013.01); H04W 12/06 (2013.01); *H04W 88/04* (2013.01);
(Continued)

(58) Field of Classification Search
CPC ..... H04L 63/10; H04L 67/04; H04L 63/1483; H04L 63/0807; H04L 63/20; H04L 67/02; H04L 29/06; H04W 4/00; H04W 12/06; H04W 88/04
USPC .................................. 726/7, 9; 713/170, 172
See application file for complete search history.

(56) References Cited

U.S. PATENT DOCUMENTS

| 6,292,798 B1 | 9/2001 | Dockter et al. |
| 6,405,202 B1 | 6/2002 | Britton et al. |
| 6,757,821 B1 | 6/2004 | Akiyama et al. |

(Continued)

FOREIGN PATENT DOCUMENTS

| CA | 2753545 A1 | 3/2012 |
| EP | 1986395 A1 | 10/2008 |

(Continued)

OTHER PUBLICATIONS

"Canadian Application Serial No. 2,753,545, Office Action mailed Apr. 8, 2014", 3 pgs.

(Continued)

*Primary Examiner* — Matthew Smithers
(74) *Attorney, Agent, or Firm* — Fleit Gibbons Gutman Bongini & Bianco P.L.

(57) ABSTRACT

This document discusses, among other things, a method for authenticating a browser executing on an auxiliary device with a web service executing on a portable electronic device. The method includes receiving a request for a resource from the browser, determining whether the request identifies a protected resource, and selectively authenticating the request based on whether the request identifies a protected resource.

20 Claims, 4 Drawing Sheets (51) Int. Cl.
*H04L 29/08* (2006.01)
*H04W 88/04* (2009.01)

(52) U.S. Cl.
CPC ............ *H04L63/1483* (2013.01); *H04L 67/04* (2013.01); *H04L 67/02* (2013.01)

(56) References Cited

U.S. PATENT DOCUMENTS

| | | | |
|---|---|---|---|
| 6,772,350 | B1 | 8/2004 | Belani et al. |
| 6,795,967 | B1 | 9/2004 | Evans et al. |
| 6,957,330 | B1 | 10/2005 | Hughes |
| 7,231,661 | B1 | 6/2007 | Villavicencio et al. |
| 7,246,374 | B1 | 7/2007 | Simon et al. |
| 7,331,058 | B1 | 2/2008 | Gladney |
| 8,132,242 | B1 | 3/2012 | Wu |
| 8,578,461 | B2 * | 11/2013 | Brown et al. .................. 726/7 |
| 2001/0047485 | A1 | 11/2001 | Brown et al. |
| 2002/0019944 | A1 | 2/2002 | Kou |
| 2002/0112155 | A1 | 8/2002 | Martherus et al. |
| 2003/0196084 | A1 | 10/2003 | Okereke et al. |
| 2005/0210270 | A1 | 9/2005 | Rohatgi et al. |
| 2007/0289006 | A1 | 12/2007 | Ramachandran et al. |
| 2008/0081609 | A1 | 4/2008 | Burgan et al. |
| 2008/0222711 | A1 | 9/2008 | Michaelis |
| 2010/0031317 | A1 | 2/2010 | Mason et al. |
| 2010/0077216 | A1 | 3/2010 | Kramer et al. |
| 2010/0100927 | A1 | 4/2010 | Bhola et al. |
| 2010/0242097 | A1 | 9/2010 | Hotes et al. |
| 2010/0319053 | A1 | 12/2010 | Gharabally |
| 2011/0145833 | A1 | 6/2011 | De Los Reyes |
| 2011/0231670 | A1 | 9/2011 | Shevchenko et al. |
| 2011/0314467 | A1 | 12/2011 | Pearson |
| 2012/0054853 | A1 | 3/2012 | Gupta et al. |
| 2012/0075062 | A1 | 3/2012 | Osman et al. |
| 2012/0079582 | A1 | 3/2012 | Brown et al. |
| 2012/0202527 | A1 | 8/2012 | Obradovich et al. |

FOREIGN PATENT DOCUMENTS

| | | |
|---|---|---|
| EP | 2434794 A1 | 3/2012 |
| GB | 2408179 A | 5/2005 |
| WO | WO-2009014975 A1 | 1/2009 |

OTHER PUBLICATIONS

"Canadian Application Serial No. 2,753,545, Response filed Jan. 3, 2014 to Office Action mailed Jul. 5, 2013", 24 pgs.

"U.S. Appl. No. 10/524,353, Non Final Office Action mailed Sep. 21, 2012", 13 pgs.

"U.S. Appl. No. 13/098,456, Non-Final Office Action mailed Sep. 13, 2012", 19 pgs.

"U.S. Appl. No. 13/243,683, Non Final Office Action mailed Jan. 18, 2013", 10 pgs.

"U.S. Appl. No. 13/243,683, Notice of Allowance mailed Jun. 25, 2013", 9 pgs.

"U.S. Appl. No. 13/243,683, Response filed Apr. 18, 2013 to Non Final Office Action mailed Jan. 18, 2013", 11 pgs.

"Canadian Application Serial No. 2,753,545, Office Action mailed Jul. 5, 2013", 5 pgs.

"European Application Serial No. 11182929.7, Response filed Sep. 28, 2012 to Extended Search Report mailed Jan. 5, 2012", 12 pgs.

"European Application Serial No. 11182929.7, Extended Search Report mailed Jan. 5, 2012", 6 pgs.

"International Application Serial No. PCT/CA2011/001058, International Search Report and Written Opinion mailed Dec. 21, 2011", 9 pgs.

Zeller, W, et al., "Cross-Site Request Forgeries: Exploitation and Prevention", Department of Computer Science of Princeton University, [Online]. Retrieved from the Internet <https://www.eecs.berkeley.edu/~daw/teaching/cs261411/reading/csrf.pdf>, 13 pgs, 2008.

* cited by examiner

AUTHENTICATING AN AUXILIARY DEVICE FROM A PORTABLE ELECTRONIC DEVICE

CLAIM OF PRIORITY

This application is a continuation of U.S. application Ser. No. 13/243,683, filed Sep. 23, 2011, now issued as U.S. Pat. No. 8,578,461, which claims the benefit of priority, under 35 U.S.C. §119(e), to U.S. Provisional Patent Application Ser. No. 61/386,689, titled "AUTHENTICATING AN AUXILIARY DEVICE FROM A PORTABLE ELECTRONIC DEVICE", filed on Sep. 27, 2010, all of which are hereby incorporated by reference herein their entirety.

BACKGROUND

Data security is an important consideration when using any electronic device. Many portable electronic devices have security features to protect access to data on the portable electronic device and/or use of the portable electronic device. The security features can include requiring that specific information be provided to the portable electronic device in an attempt to verify that a user of the portable electronic device user has authority to access the data. The information can be in the form of a password, answers to questions, pattern input, or other forms of information. Ideally the information is such that only authorized users have access to the information and it is difficult for unauthorized users to obtain the information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example but not by way of limitation, various embodiments discussed in the present document.

DETAILED DESCRIPTION

In an example, the portable electronic device can be configured to communicatively couple to an auxiliary device. This auxiliary device can send and receive information to/from the portable electronic device. For example, information (e.g., email messages) from the portable electronic device can be sent to the auxiliary device and rendered thereon.

The present inventors have recognized, among other things, a method for securely accessing a portable electronic device from an auxiliary device. The portable electronic device can authenticate requests from the auxiliary device to verify that the auxiliary device (and a user thereof) has authority to access data on the portable electronic device. In an example, the portable electronic device can perform token based authentication of the auxiliary device. In an example, the authentication scheme can be resistant to cross-site request forgery attacks.

Figure 1:
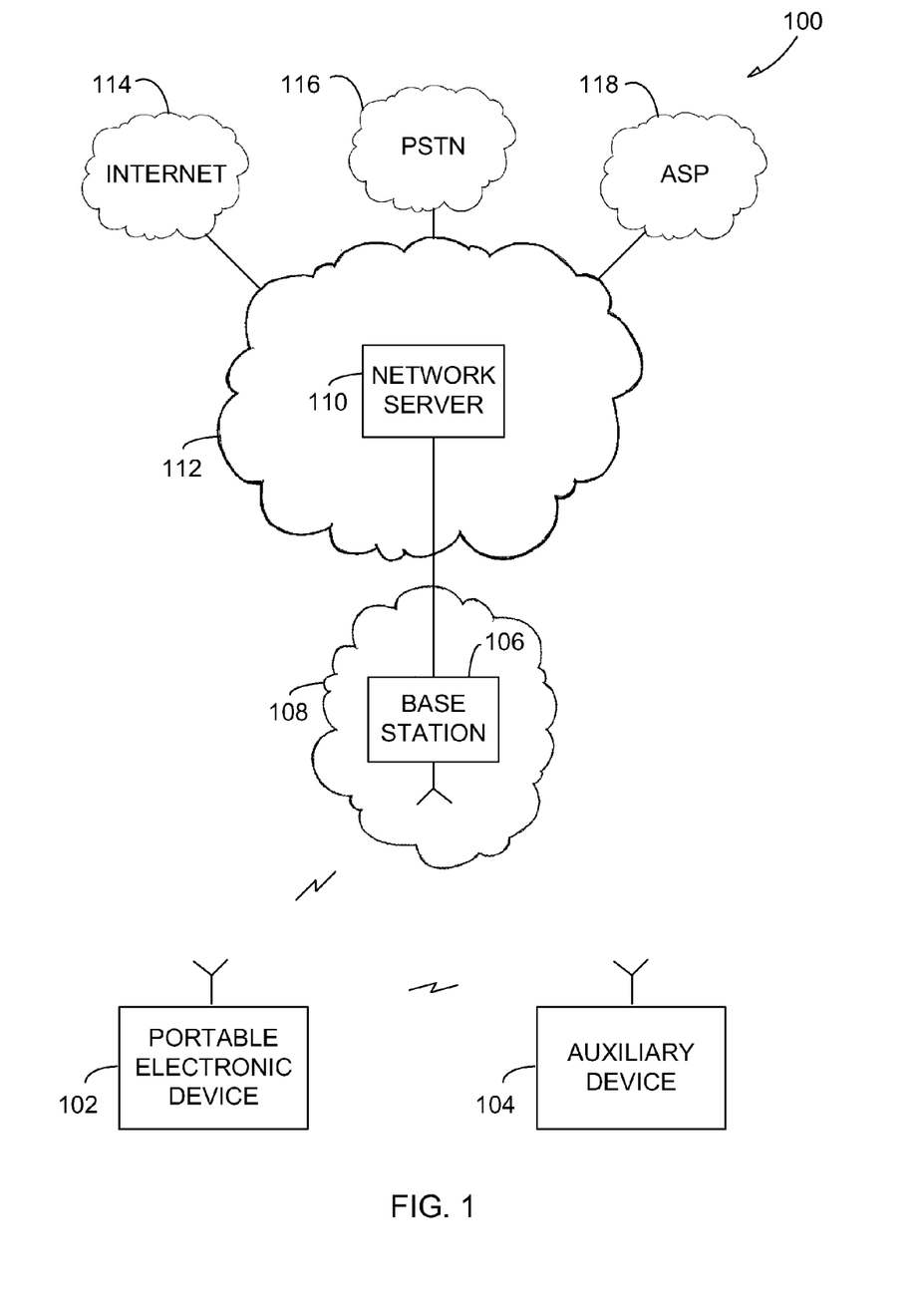
FIG. 1 illustrates generally a block diagram of an example communication system including a portable electronic device communicatively coupled to an auxiliary device.

FIG. 1 illustrates generally a block diagram of an example communication network 100 including a portable electronic device 102 communicatively coupled to an auxiliary device 104. The portable electronic device 102 can be configured to transmit and receive signals (e.g., wireless signals) with a base station 106 in an access network 108. The base station 106 can forward information between the portable electronic device 102 and one or more network servers 110 in a core network 112. From the core network 112 information can be sent through the internet 114, public switched telephone network (PSTN) 116, or an application service provider network (ASP) 118. Information is also received at the core network 112 from the internet 114, PSTN 116, or ASP 118. Through the access network 108 and core network 112, the portable electronic device 102 can send and receive information to/from remote devices, including other portable and non-portable electronic devices, such as mobile phones, servers, personal computers, etc.

In an example, the communications network 100 operates at least partially in accordance with a 3rd Generation Partnership Project (3GPP) based standard. In an example, the communication network 100 operates according to a Global System for Mobile Communications (GSM) family of a 3GPP based standard. In an example, the communications network 100 can operate in accordance with other standards, including a Worldwide Interoperability for Microwave Access (WiMAX) standards profile, a WCDMA standards profile, a 3G HSPA standards profile, and a Long Term Evolution (LTE) standards profile. In an example, portable electronic device 102 can communicate with base station 106 through a wired connection.

As mentioned above, the portable electronic device 102 can be communicatively coupled (e.g., tethered) to the auxiliary device 104. This communicative link can be through a wired or wireless connection. In an example, when the communicative link is wireless, the link can operate in accordance with a Bluetooth™, Wi-Fi®, near field communication (NFC), or radio-frequency identification (RFID) connection. In other examples, when the communicative link is wired, the link can operate in accordance with a universal serial bus (USB) or IEEE 1394 (Firewire) protocol. In an example, the link can be effected indirectly through, for example, a local area network or a Wi-Fi network, or even through a wide area network such as the internet 114.

In an example, portable electronic device 102 can include a mobile phone (e.g., a smart phone), a laptop computer, a portable email paging device, a network enable digital camera, a portable music player, a portable video player, a portable video game player, or other portable device with communication capabilities. Additionally, the auxiliary device 104 can include a laptop, a desktop computer, a tablet, or other computing device.

Figure 2:
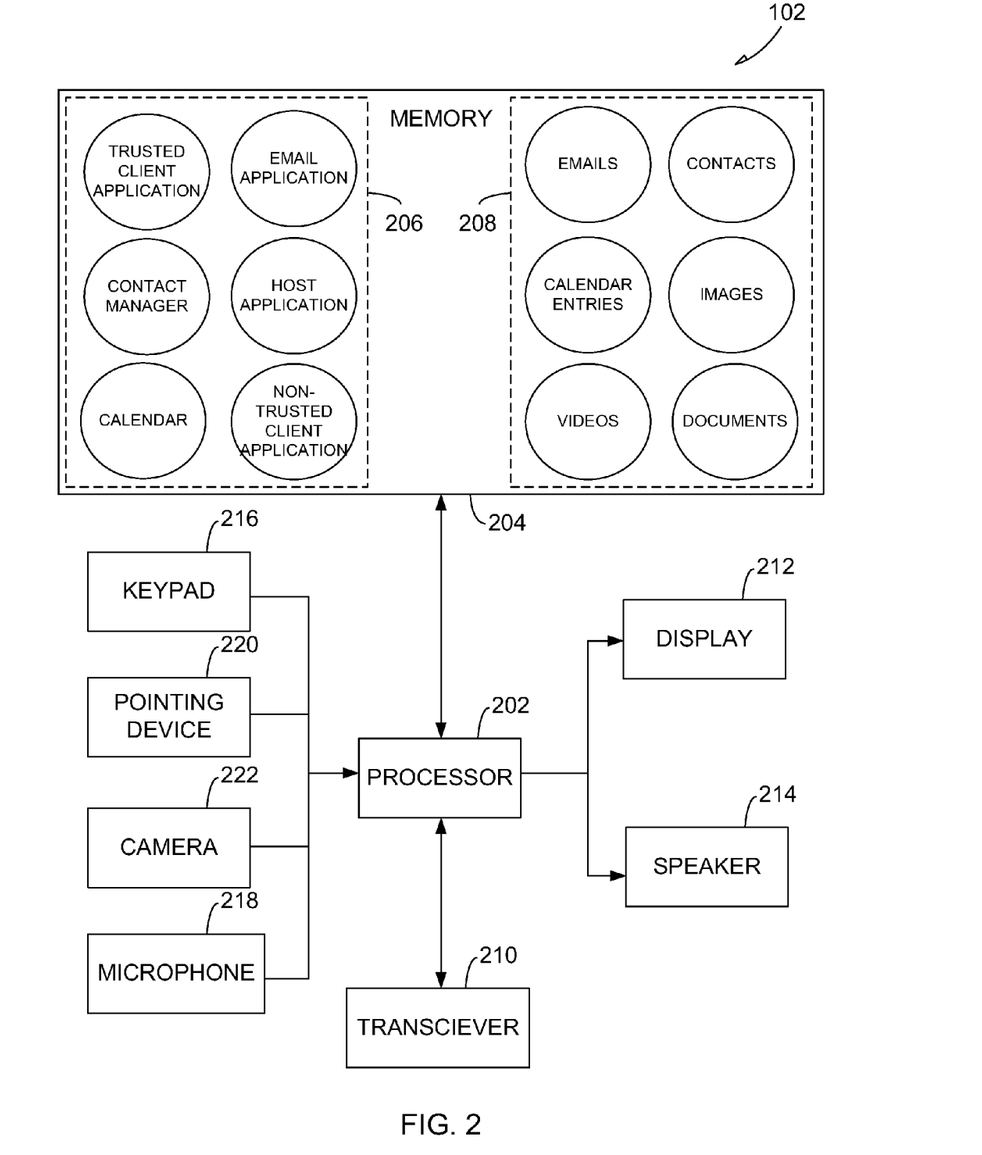
FIG. 2 illustrates generally a block diagram of an example portable electronic device of FIG. 1.

FIG. 2 illustrates a block diagram of an example portable electronic device 102. The portable electronic device 102 can include a processor 202 coupled to a memory 204 having instructions 206 thereon for execution by the processor 202. The processor 202 can include any component capable of executing instructions 206. For example, the processor 202 can include a central processing unit (CPU), a microprocessor, a network processor, microcontroller, or a field programmable gate array (FPGA). As an example, the processor 202 is "configured" to perform a function when the memory 204 includes instructions 206 which, when executed by the processor 202, cause the processor 202 to carry out the function.

The memory 204 can include volatile storage (e.g., random access memory) or non-volatile storage (e.g., Flash, hard disc drive, solid state drive). The memory can also include data 208 for use by the instructions 206 and the processor 202.

The portable electronic device 102 can also include one or more transceivers 210 for transmitting and receiving signals from external devices (e.g., base station 106 and auxiliary device 104). The portable electronic device 102 can include one or more output devices such as a display 212 and a speaker 214 for providing information for a user, and one or more input devices for receiving information from a user. The input devices can include a keypad 216, microphone 218, pointing device 220, or camera 222, and can be incorporated into the display 212 such as in a touch screen. The processor 202 can be configured to control the display 212, speaker 214, and transceiver 210 in accordance with the instructions 206 and can be responsive to different input received from the input devices.

The one or more transceivers 210 can be configured to communicate with the base station 106 and the auxiliary device 104 using their corresponding protocols. For example, the one or more transceivers 210 can be configured to communicate with the base station 106 in accordance with a 3GPP based standards profile and can also be configured to communicate with the auxiliary device 104 using a Bluetooth™ connection.

In an example, the instructions 206 can include one or more applications which can be executed by processor 202 to perform a desired function. For example, an email application can be executed by the processor 202 to display email messages on display 212 as well as enable a user to send and receive emails via the communication network 100. The applications on the memory 204 can include a host application (e.g., a webserver) and a plurality of content handler applications. The host application can manage communications with the auxiliary device 104, as discussed below, while the content handler applications can manage interaction between a user and data 208 and/or a remote server (e.g., on the internet). The content handler applications can include the email application to store emails (e.g., data 208) on the memory 204 for quick access in the future. Additionally, the content handler applications can include a contact manager application that can display contacts for a user and enable the user to enter and edit contacts (e.g., data 208) stored on the memory 204. The content handler applications can include a calendar application that can display a calendar and enable a user to add and edit calendar entries (e.g., data 208) stored on the memory 204. Data 208 can include images, videos, documents (e.g., Word™ documents), among other data. The content handler applications can include trusted applications and non-trusted applications such as those described below.

Figure 3:
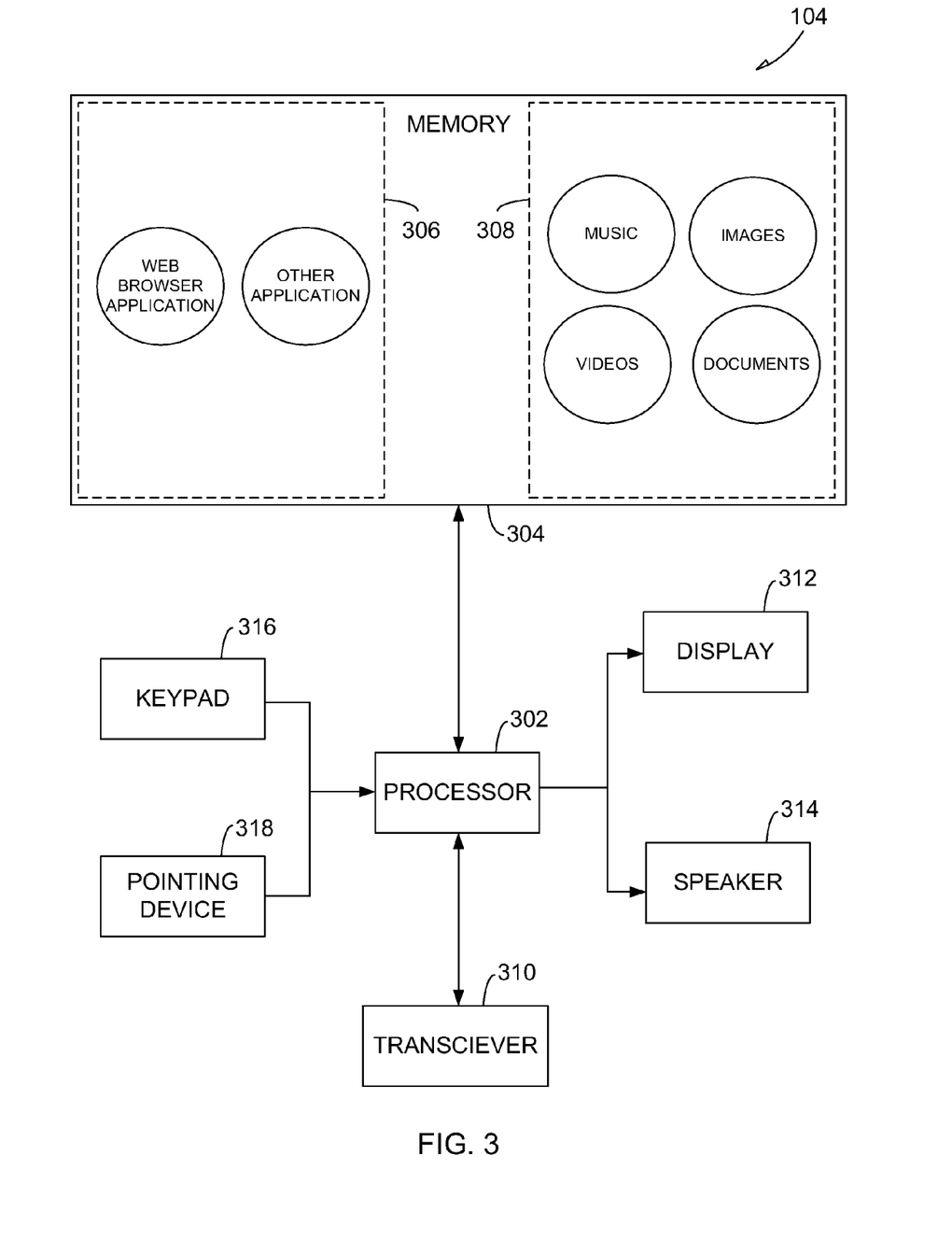
FIG. 3 illustrates generally a block diagram of an example auxiliary device of FIG. 1.

FIG. 3 illustrates a block diagram of an auxiliary device 104. The auxiliary device 104 can include a processor 302 coupled to a memory 304 having instructions 306 thereon for execution by the processor 302. The processor 302 can include any component capable of executing instructions 306. For example, the processor 302 can include a central processing unit (CPU), a microprocessor, a network processor, microcontroller, or a field programmable gate array (FPGA). As an example, the processor 302 is "configured" to perform a function when the memory 304 includes instructions 306 which, when executed by the processor 302, cause the processor 302 to carry out the function. The memory 304 can include volatile storage (e.g., random access memory) or non-volatile storage (e.g., Flash, hard disc drive, solid state drive). The memory can also include data 308 for use by the instructions 306 and the processor 302.

The auxiliary device 104 can include one or more transceivers 310 for transmitting and receiving signals from external devices (e.g., the portable electronic device 102). The auxiliary device 104 can include one or more output devices such as a display 312 and a speaker 314 for providing information to a user, and one or more input devices for receiving information from a user. The input devices can include a keyboard 316 and pointing device 318, and can be incorporated into the display 312 such as in a touch screen. The processor 302 can be configured to control the display 312, speaker 314, and transceiver 310 in accordance with the instructions 306 and can be responsive to different inputs received from the input devices. In an example, the auxiliary device 104 can have direct access to the access network 108. In an example, the auxiliary device 104 does not have direct access to the access network 108. When the auxiliary device 104 can access the access network 108 or other network, the transceiver 310 can be configured to communicate in accordance with a standard or protocol used by the access network 108 or other network (e.g., 3GPP based standards profile). In any case, the one or more transceivers 210 can be configured to communicate with the auxiliary device 104 using, for example, a Bluetooth™ connection.

The auxiliary device 104 can be based on any computing environment that provides web browsing functionality. For example, such a computing environment can be based on an Intel™, AMD™, or other microprocessor. The instructions 306 can include an operating system for the auxiliary device 104 including, for example, an operating system offered by Microsoft, a Linux™ operating system, an operating system offered by Apple Computer, or an operating system offered by QNX™. Additionally, the instructions 306 can include a web browser application (also referred to herein as "browser"). The browser can be any browser that is executable on the respective operating system, including Firefox™, Internet Explorer™, Chrome™, Opera™, Safari™, or a browser from QNX™. Typically, though not necessarily, the display 312 and/or keyboard 316 are larger than that provided on the portable electronic device 102. For example, the auxiliary device 104 can comprise a laptop or tablet tethered to the portable electronic device 102 (e.g., a smartphone).

In an example, the auxiliary device 104 can be configured to receive information from the portable electronic device 102 and render the information on the display 312 and/or output the information from the speaker 314. In an example, the communication between the auxiliary device 104 and the portable electronic device 102 can occur between the browser on the auxiliary device 104 and the host application on the portable electronic device 102. The host application can include a web service for communicating with the browser and a plurality of application plug-ins for interfacing with the other applications on the portable electronic device 102. The web service can be configured to generate and serve web pages to the browser on behalf of the other applications on the portable electronic device 102 via their respective plug-ins. Application plug-ins can be configured to act as programming interfaces between the web service and their corresponding applications. Accordingly, each application plug-in can provide information to the web service that the web service can use to generate hypertext markup language (HTML) as desired, and/or any other code (e.g., JavaScript, style sheets, etc.) that are usable by the browser. Thus, graphical interfaces can be generated on the auxiliary device 104 using information from the portable electronic device 102.

In an example, the portable electronic device 102 can be protected with an access control mechanism (e.g., a password) such that the portable electronic device 102 is locked until the access control mechanism is satisfied (e.g., the password is entered). The access control mechanism is referred to herein as a password. However, it should be understood that other access control mechanisms can be used, including non-text based passcodes, biometric controls, and question and answer cue/response pairs.

As mentioned above, the auxiliary device 104 can be configured to receive information from the portable electronic device 102 and output the information to a user. The portable electronic device 102 can be configured to restrict (e.g., prevent) access to the portable electronic device 102, unless a user can provide knowledge of the password, in order to maintain the access control of the portable electronic device 102. In an example, the portable electronic device 102 can be unlocked by the auxiliary device 104. Locking/unlocking the portable electronic device 102 can include locking/unlocking the portable electronic device 102 for direct use (e.g., use via the input and output components of the portable electronic device 102), and locking/unlocking for use by the auxiliary device 104.

In an example, the portable electronic device 102 can default to a locked state and the password can be provided to unlock the portable electronic device 102. In the locked state, access can be restricted to some or all of the contents of the portable electronic device 102. The portable electronic device 102 can be unlocked by providing the correct password. As an example, the portable electronic device 102 can be unlocked for direct use by inputting the password with the keypad 216. Unlocking the portable electronic device 102 for use by the auxiliary device 104 is discussed below.

Once unlocked the portable electronic device 102 can allow access to the contents that were restricted while the device was locked, unless an application specific mechanism restricts specific content. The portable electronic device 102 can be manually locked by providing a corresponding command (e.g., clicking "lock device"). The portable electronic device 102 can also be automatically locked, for example, after non-use for a period of time.

In an example, when in the locked state, the portable electronic device 102 can limit input or output to/from one or more of the applications, and/or the portable electronic device 102 can limit output of data 208 from the memory 204. In an example, while in the locked state, the portable electronic device 102 can prevent a user from making and/or receiving telephone calls. It should be understood that the level of access provided while the portable electronic device 102 is locked can be dependent upon the level of security desired. Accordingly, as a high security example, the portable electronic device 102 can restrict all access to the portable electronic device 102 while the portable electronic device 102 is locked. In a medium security example, however, the portable electronic device 102 can provide access to some of its content while restricting access to other content, such as is described below with respect to FIG. 4.

In an example, restricted access can be achieved, at least in part, by encrypting the content to which access is to be restricted. Accordingly, unlocking the portable electronic device 102 can include granting access to the applications as well as decrypting the data for use by the applications. In an example, the password used to provide access to the applications can be used to derive a key that can be used to decrypt the data. Accordingly, a single password can be provided to the portable electronic device 102 to grant access to the applications and to decrypt the data.

As mentioned above, the portable electronic device 102 can be unlocked for use by the auxiliary device 104. In an example, the portable electronic device 102 is unlocked with respect to the web browser on the auxiliary device 104, and is accordingly referred to herein as unlocking the portable electronic device 102 for use by the browser. A communicative connection can be established between the auxiliary device 104 and the portable electronic device 102 (e.g., a Bluetooth connection). The user can direct the browser on the auxiliary device 104 to contact the portable electronic device 102 over the communicative connection by, for example, entering a universal resource locator (URL) or internet protocol (IP) address corresponding to the web service of the host application on the portable electronic device 102. In an example, a proxy application can be used to configure the auxiliary device 104 so that entry of a given URL or IP address in an address bar of the browser directs the browser to connect with the web service of the host application on the portable electronic device 102, and to generate a web page on the display of the auxiliary device 104 that corresponds to a web page being offered by the web service. In an example, the instance of the browser on the auxiliary device 104 can be pre-configured to contact a particular URL or IP address, in which case the browser may not display an address bar. In an example, a proxy application running on the auxiliary device 104 can be configured to communicate with the web service of the host application on the portable electronic device 102, and the browser on the auxiliary device 104 can communicate with the web service via this proxy application. In an example, communication between the browser and the web service is in accordance with the hypertext transfer protocol (HTTP). The browser can be configured to generate an HTTP request for a resource from the web service, and the web service, in turn, can be configured to respond to the HTTP request (e.g., an HTTP server response).

In an example, when initially accessing the portable electronic device 102 from the auxiliary device 104, the web service can prompt the browser to display a login page. The user can enter a password into the prompt and the browser can provide the password to the web service. Notably, in an example, no username is needed and only a password is provided to the web service. If the password is correct, the web service unlocks the portable electronic device 102 for use by the browser. Notably, in an example, the portable electronic device 102 can be unlocked for use by the browser, but can remain locked for direct use (e.g., use of input/output devices on portable electronic device 102).

As mentioned above, in an example the content of the portable electronic device 102 can be encrypted. Encryption can restrict the web service's access to the content. Accordingly, even if the contents were unlocked (e.g., access granted) for use by the browser after a successful login sequence, neither the web service nor the browser could use or render the contents due to their encrypted nature. In an example, the key for decrypting the contents of the portable electronic device 102 can be provided to the portable electronic device 102 directly (e.g., using keypad 216) prior to initiating a login sequence from the browser. In examples where the key for decrypting the content can be derived from the password used to grant access to the applications, the key can be provided by unlocking the portable electronic device 102 for direct use as discussed above. While the key is accessible to the portable electronic device 102 for use to decrypt the contents (e.g., when the portable electronic device 102 is unlocked for direct use), the login sequence can be initiated by the browser. After a successful login sequence by the browser of the auxiliary device 104 while the key is accessible to the portable electronic device 102, the web service can request and store a content protection ticket. The content protection ticket can grant the web service access to the contents of the portable electronic device 102 even when the portable electronic device 102 is locked for direct use.

In an alternative example, the portable electronic device 102 can be configured to decrypt the contents based on a key (e.g., the password) provided by the auxiliary device 104. In such a system, the web service can request and store a content protection ticket such that the user does not need to provide the password with every request. It should be understood that, in an example, the key to decrypt the content can be provided via a successful login sequence to unlock the portable electronic device 102 for use by the browser.

As mentioned above, regardless of whether or not the contents of the portable electronic device 102 are encrypted, a user can provide a password to gain access to the portable electronic device 102. It is, however, inconvenient to require a user to login to the portable electronic device 102 for every single request made by the browser, particularly because HTTP can involve many different requests to access the contents on a single HTML page (e.g., each image involves a separate HTTP request). Accordingly, after a successful login sequence the portable electronic device 102 can remain unlocked for use by the browser on a session basis. In order to insure that information is not provided to an unsecure source while unlocked for use by the browser, the web service can verify that any requests received are from the browser on the auxiliary device 104. In order to verify the origin of requests, the web service can generate a token upon a successful login sequence and provide the token to the browser (e.g., a session ID in a cookie). The browser can then send the token with any requests to the web service and the token can be used to authenticate the browser (e.g., the session ID cookie). The token can remain valid forever or can expire based on certain criteria. The web service can maintain a list of valid (e.g., non-expired) tokens. The web service can remove tokens from the list if and when they expire. As examples, a token can be configured to expire when the communicative connection between the auxiliary device 104 and the portable electronic device 102 is dropped, after the token has not been used for a period of time, at a particular time in the future, or after a manual logout (e.g., locking) of the portable electronic device 102, such as by the auxiliary device 104.

The token can take many forms including a random value that the web service generates to identify the browser, or the token can be generated from the password used to unlock the portable electronic device 102. In an example, the contents of the portable electronic device 102 are encrypted and the password can be used to decrypt the contents. Accordingly, when the token is generated from the password, each time the token is sent to the portable electronic device 102 the password can be recovered from the token and used to decrypt the contents and provide the requested contents to the browser. In an example, the password is encrypted to create the token (or part of the token). Here the web service can have a long-living encryption key that is used repeatedly, or the web service can generate a new encryption key each time it generates a token. If the encryption key is stored for at least as long as the token is valid, the web service can recover the password from the token for as long as the token is valid.

In examples where the content is encrypted and a content protection ticket is obtained by the web service, the content protection ticket can be stored by the web service for the lifetime of a corresponding browser token, or the content protection ticket can be released after a period of time such that the user can unlock the portable electronic device 102 for direct use (e.g., by using keypad 216) in order to enable the web service to request another content protection ticket.

Alternatively, in examples where the web service is able to recover the password from the token, the portable electronic device 102 can use the password from the token programmatically to gain access to the contents of the portable electronic device 102. In such a system, the web service can recover the password on every request, or may request and store a content protection ticket after being provided the password so that the web service doesn't need to recover the key on every request. Similar to the example described above, the content protection ticket can be released after a period of time and this period of time can be shorter than when the password must be provided directly to the portable electronic device 102 because the portable electronic device 102 has access to the password via the token.

One risk in using a browser and a token to unlock the portable electronic device 102 is a cross-site request forgery (XSRF) attack. For example, in a standard HTTP request to a domain (e.g., www.mybank.com), a browser will transmit all cookies associated with the domain. If authentication authorization is stored in a cookie, as is generally done, the authentication authorization will be sent in a request to the domain. An XSRF attack involves causing the browser to request a URL for the domain to perform an attack when an authentication authorization exists as a cookie. For example, a malicious entity can include an image tag with a malicious "src" attribute, such as <imgsrc="www.mybank.com?action=transfer&from_account=savings&to_account=malicious_entity&amount=a+lot+of+money">. Generally, the browser will request (e.g., execute) the "src" URL (ostensibly to obtain the image) and, if the authentication authorization is stored in a cookie, forward the authentication authorization to the domain. The domain reading the authentication authorization will generally assume that the user has authenticated and perform the action (e.g., transfer money from the user's savings account to the malicious entity's account). Thus, the XSRF attack is accomplished and the malicious entity in this example has made off with a lot of money.

In an example, in order to combat against XSRF attacks, the web service can require that a valid token be provided in two distinct places in an HTTP request for a resource. The first place can be in the HTTP header field named "Cookie" (e.g., the token is stored as a cookie). Accordingly, the token can be inserted in the HTTP header field named "Cookie" and sent with the request.

The second place in which the token can be provided can include any other part of the HTTP request. In an example, the second place can include one of a custom HTTP header field and/or associated field name or a URL parameter. As an example, if the token comprises the value in a name-value pair (e.g., as in a cookie), the token can be provided in a custom HTTP header field by using the name of the name-value pair as the custom HTTP header field name and the value of the name-value pair in the custom HTTP header field itself. For example, for a token comprising "2001" and a corresponding name-value pair comprising "Sapphire-Token=2001", the custom HTTP header field can be named "Sapphire-Token" while the custom HTTP header field itself can include "2001". In other examples, other methods can be used to create a custom HTTP header field and/or associated field name including the token. In particular, it should be understood that including a token in a custom HTTP header field and/or associated field name includes putting the token in one or more of the custom HTTP header field name, the custom HTTP header field itself, or both. Additionally, as an example, the URL parameter can include a GET parameter, a POST parameter, or a combination thereof.

Requiring a valid token in two places can protect against a XSRF attack since a typical XSRF attack will only provide a token in an HTTP cookie because browsers generally include cookies associated with a domain in HTTP requests to that domain. By requiring that the token be included in both a cookie and elsewhere in the request, the web service can make it more probable that a mechanism to duplicate the token, for example JavaScript from the web service, is running in the browser on the auxiliary device 104 to read the token from the browser's storage area and include the token in the second location. In an example, the web service can be configured to include a script element in content (e.g., HTML pages) sent to the portable electronic device 102. The script element can be configured to run in the browser of the auxiliary device 104, read the token from the first location, and copy the token to the second location of an HTTP request. In an example, the script element can be configured to run when the HTTP request is made by the browser. Generally it is very difficult for a malicious entity (e.g., an attacker) to execute malicious scripting elements (e.g., JavaScript) within the context of an uncontrolled domain (e.g., in HTTP requests to domains the malicious entity does not control). Accordingly, looking, for example, by the web service, for the token in at least two places of an HTTP request can provide an additional level of security, including against XSRF attacks.

Figure 4:
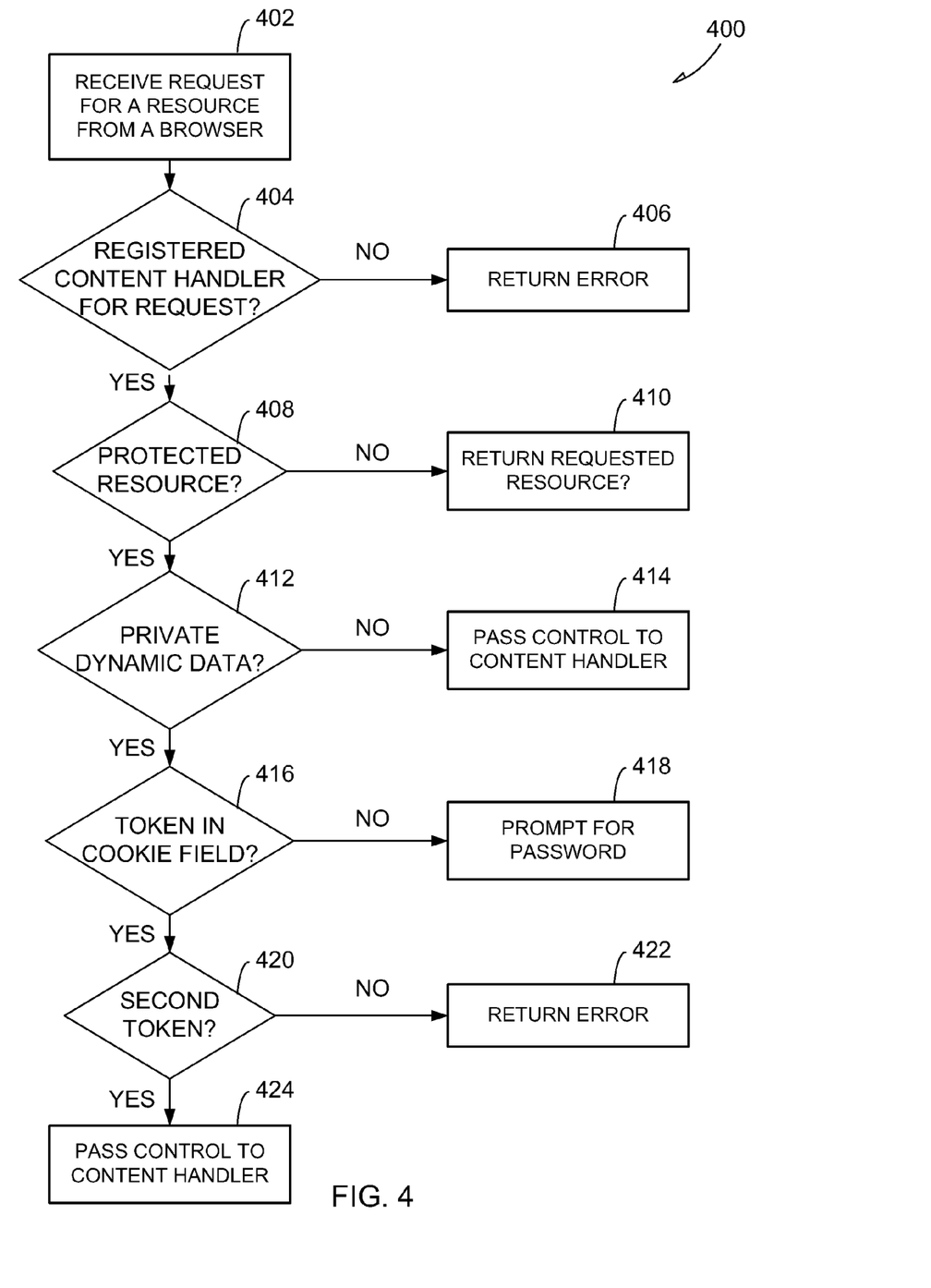
FIG. 4 illustrates generally an example flow chart for authenticating an auxiliary device from a portable electronic device.

FIG. 4 illustrates an example of a method 400 for authenticating an auxiliary device 104 at a web service executing on a portable electronic device 102. Method 400 provides a means for using a token provided by the web service to authenticate requests from a browser executing on an auxiliary device 104 after a successful login sequence has been completed as discussed above.

At block 402, the web service receives an HTTP request for a resource from a browser on the auxiliary device 104. At block 404, the web service determines whether there is a content handler application (also referred to herein as "content handler") that has registered with the web service to provide the resource. If there is no content handler that has registered to provide the resource, the method 400 proceeds to block 406 where the web service returns an error (e.g., HTTP 404 Not Found) and the method 400 ends. If there is a content handler that has registered to provide the service, the method 400 proceeds to block 408 to query the content handler to determine if the request identifies a protected resource.

In an example, the resources (e.g., contents) on the portable electronic device 102 can be divided into unprotected resources and protected resources. In an example, an unprotected resource can include static data. Static data can include data contained within a compiled code module (e.g., a resource that can be inserted into a COD file format). In an example, static data can include content that does not change over time, is built at a central location (e.g., at a service provider of the portable electronic device 102) and sent to the portable electronic device 102, and is generally the same for different users. Static data can include an HTML page, CSS file, JavaScript file, static image, and/or an icon. In another example, an unprotected resource (e.g., a resource that can be accessed without authentication) can be a compiled code module that is signed at compilation time with a private key (e.g., a key known only to the manufacturer of the portable electronic device 102) to provide higher security. This can help ensure that malicious code running on the portable electronic device 102 cannot dynamically create a compiled code module in an unauthorized manner.

In an example, a protected resource can include all content that is not an unprotected resource. Accordingly, in an example, where unprotected resources include all static data, the protected resources can include all of the dynamic data on the portable electronic device 102. In an example, dynamic data can include user specific content, content that is generated at the portable electronic device 102, and content that changes over time. Dynamic data can further be divided into public dynamic data and private dynamic data.

Generally speaking, private dynamic data includes dynamic data in which there is a desire (e.g., by the user) to restrict access, and public dynamic data includes all other dynamic data in which there is no desire to restrict access. The level of inclusivity of the private dynamic data category can vary depending on the level of security desired, for example, by the user. A higher level of security can result in more types of data being included within the private dynamic data category, while a lower level of security can result in fewer types of data being included within the private dynamic data category. In an example, however, private dynamic data can include all data that is personal in nature while public dynamic data can include data that is non-personal in nature.

Private dynamic data, for example, can be personal in nature in that the data contains information relating to a user of the portable electronic device 102. Private dynamic data, for example, can include email messages, contacts, images, videos, calendar entries, recent phone calls, favorite web pages, recently browsed web pages, and other private items of data. Private dynamic data can be generated on the portable electronic device 102 by a user (e.g., in the case of images, videos, sent emails, contacts, etc.), or private dynamic data can be specifically directed to the portable electronic device 102 (e.g., by the auxiliary device 104) for a user of the portable electronic device 102. Generally, private dynamic data is not widely distributed, although some private dynamic data (e.g., emails) may be sent to multiple recipients if so directed. Notably, due to their inherent use of private dynamic data, access to (e.g., output from or input to) many or all of the instructions 206 (e.g., the email application) on the portable electronic device 102 can be restricted in order to limit access to the private data. In an example, however, the instructions 206 can be permitted to execute in the background without providing output to, or receiving input from, a user.

Public dynamic data, in contrast, can include dynamic data that is not personal in nature. Public dynamic data can include operating conditions of the portable electronic device 102 (e.g., current battery level, code line being currently executed, radio signal strength, display brightness), and high level information regarding private data (e.g., number of new email messages, incoming call notification, caller-ID, etc.).

When the unprotected resources are further limited to compiled code modules that are signed at compilation time with a private key, protected resources can include the dynamic data as along with any compiled code modules that are not signed at compilation time with a private key. If the compiled code modules are not signed, they can be treated as private dynamic data as discussed below. As discussed below, access to the private dynamic data, or dynamic data in general, can require a request from the browser of the auxiliary device 104 to be authenticated.

At block 408 the web service queries the content handler whether the request identifies a protected resource. If the request does not identify a protected resource, the method 400 proceeds to block 410. If the request does identify a protected resource, the method 400 proceeds to block 412.

In an example, at block 410 the web service returns the requested resource to the browser of the auxiliary device 104. In another example, at block 410, the web service can determine whether it should look for a token before returning the unprotected resource to the browser. In an example, the web service can determine whether it should look for a token by determining whether a protected resource is likely to be requested in the near future. In an example, the web service may make the determination by querying the content handler whether a protected resource may be requested in the near future (e.g., a protected resource is referenced by an unprotected resource that is the subject of a current request). In an example, the content handler can include knowledge of a sequence of requests that a client will generally make (e.g., given a first request, a general client is most likely to perform a particular second request), and, as a result, can include the means to make such a determination.

If a protected resource is likely to be requested in the near future, simply providing the unprotected resource to the browser may be wasteful because once the browser requests the protected resource (e.g., a protected image embedded in an unprotected HTML page), the web service will request the user to login. Thus, time may be wasted by downloading the unprotected content when the unprotected content can't be used (e.g., rendered) until the login request is successfully completed. Accordingly, if a protected resource is likely to be requested in the near future, the web service can be configured to authenticate the browser when an unprotected resource is requested. In an example, the web service can be configured to look for a token in the HTTP header field named "Cookie", as described below with respect to block 416. If such a token is not found, or if the value of the token is not recognized (e.g., as associated with the browser, the session, the user, etc.), then the method 400 proceeds to block 418 where the web service redirects the browser to an HTML page to prompt for the password (e.g., using a HTTP 302 response). If such a token is found and the value of the token matches a token in the valid token list on the web service, the web service can return the unprotected resource. In an example, the web service can assume without checking for a second token that the browser will be successfully authenticated at a later time if needed.

Referring back to block 408, when a request identifies a protected resource, the method 400 proceeds to block 412. In an example, at block 412 the web service queries the content handler whether the request identifies private dynamic data. If the request does not identify private dynamic data, the method 400 proceeds to block 414 and the web service passes control of the request to the content handler which can return the result. If the request does identify private dynamic data, the method 400 proceeds to block 416.

In another example, at block 412 the web service can require the content handler to be a trusted content handler before allowing the content handler to differentiate between public dynamic data and private dynamic data. To be a trusted content handler, the content handler must meet certain requirements. For example, the web service can require that the content handler be authored by a particular company or be signed with a particular private key. This would allow the web service to ensure that the content handler does not incorrectly indicate that private dynamic data is public dynamic data. If the content handler can meet the requirements, the web service can use a response from the content handler regarding whether the request identifies private dynamic data as discussed above. If the content handler does not meet the requirements, the method 400 proceeds to block 416 where the web service requires successful authentication of the browser before passing control to the content handler.

At block 416, the web service looks for the HTTP header field named "Cookie" in the request from the browser and then for a particular cookie corresponding to the token. If such a cookie corresponding to the token does not exist, or if the value associated with the cookie (e.g., the token) is not recognized as a valid token, then the method 400 proceeds to block 418 where the web service redirects the browser to an HTML page to prompt for the password (e.g., using a HTTP 302 response). If such a cookie corresponding to the token is found, then the method 400 proceeds to block 420 where the web service looks for the token in at least a second location (e.g., part) of the HTTP request. In an example, the second location can be one of a custom HTTP header field and/or associated field name or a URL parameter in the HTTP request. If the web service does not find the token in the second location, or if a token in the second location does not match the token found in block 416 (e.g., associated with the cookie), the method 400 proceeds to block 422 where the web service returns an error (e.g., 403 Forbidden). If the token is found in the second location (e.g., the token in the second location does exist and does match the token associated with the cookie found in block 416), the method 400 proceeds to block 424 where the web service passes control to the content handler and the content handler returns the resource requested.

EXAMPLE EMBODIMENTS

Example 1 includes subject matter (such as a portable electronic device, apparatus, or system) configured to be communicatively coupled with an auxiliary device comprising a processor configured to receive a request for a resource from the auxiliary device, determine whether the resource is a protected resource, and responsive to a determination that the resource is a protected resource, authenticate the auxiliary device, and transmit the resource to the auxiliary device. Wherein to authenticate the auxiliary device includes to search a first location of the request for a first result, to search a second location of the request for a second result, and to prompt the auxiliary device to login if the first result does not match either the second result or a token in the list of tokens.

In Example 2, the subject matter of Example 1 can optionally include, wherein the processor is further configured to, responsive to a determination that the resource is not a protected resource, pass control of the request to a content handler associated with the resource if the request does not identify a protected resource.

In Example 3, the subject matter of one or any combination of Examples 1-2 can optionally include, wherein the processor is further configured to, responsive to a determination that the resource is not a protected resource, determine that the request is associated with an unrequested protected resource, compare the first result to the list of tokens, authenticate the request if the first result matches the token in the list of tokens, and prompt the auxiliary device to login otherwise.

In Example 4, the subject matter of one or any combination of Examples 1-3 can optionally include, wherein to authenticate the auxiliary device includes to determine that a content handler corresponding to the resource is not a trusted content handler, and to authenticate the request by the processor.

In Example 5, the subject matter of one or any combination of Examples 1-4 can optionally include, wherein to authenticate the auxiliary device includes, to determine that a content handler corresponding to the resource is a trusted content handler, to query the content handler to determine that the request does not identify private dynamic data, and to pass control of the request to the content handler without further authenticating the auxiliary device.

In Example 6, the subject matter of one or any combination of Examples 1-5 can optionally include, wherein to authenticate the auxiliary device includes to determine that the request does not identify private dynamic data, and to pass control of the request to a content handler associated with the resource without further authenticating the request.

In Example 7, the subject matter of one or any combination of Examples 1-6 can optionally include, wherein the first location is in a cookie sent with the request, the request comprising a hypertext transfer protocol (HTTP) request, and the cookie being in an HTTP request header field name Cookie, and wherein the second location is in at least one of a custom HTTP header field or a universal resource locator (URL) parameter included in the request.

Example 8 can include, or can optionally be combined with the subject matter of one or any combination of Examples 1-10 to include, subject matter (such as a method, means for performing acts, or a machine-readable medium including instruction that, when performed by the machine cause the machine to perform acts) for authenticating a browser executing on an auxiliary device by a web service executing on a portable electronic device comprising receiving, using one or more processors, a request for a resource from the browser, determining whether the resource is a protected resource, responsive to determining that the resource is a protected resource, authenticating the browser, and transmitting the resource to the browser. Wherein authenticating the browser includes searching a first location of the request for a first result, searching a second location of the request for a second result, comparing the first result, the second result, and a list of tokens, prompting the browser to login if the first result does not match either the second result or a token in the list of tokens.

In Example 9, the subject matter of Example 8 can optionally include, responsive to determining that the resource is not a protected resource, passing control of the request to a content handler associated with the resource if the request does not identify a protected resource.

In Example 10, the subject matter of one or any combination of Examples 8-9 can optionally include, responsive to determining that the resource is not a protected resource, determining that the request is associated with an unrequested protected resource, comparing the first result to the list of tokens, authenticating the request if the first result matches the token in the list of tokens, and prompting the browser to login otherwise.

In Example 11, the subject matter of one or any combination of Examples 8-10 can optionally include, wherein authenticating the browser includes determining that a content handler corresponding to the resource is not a trusted content handler, and authenticating the request by the web service.

In Example 12, the subject matter of one or any combination of Examples 8-11 can optionally include, wherein authenticating the browser includes determining that a content handler corresponding to the resource is a trusted content handler, querying the content handler to determine that the request does not identify private dynamic data, and passing control of the request to the content handler without further authenticating the request.

In Example 13, the subject matter of one or any combination of Examples 8-12 can optionally include, wherein authenticating the browser includes determining that the request does not identify private dynamic data, and passing control of the request to a content handler associated with the resource without further authenticating the request.

In Example 14, the subject matter of one or any combination of Examples 8-13 can optionally include, wherein the first location is in a cookie sent with the request, the request comprising a hypertext transfer protocol (HTTP) request, and the cookie being in an HTTP request header field name Cookie, and wherein the second location is in at least one of a custom HTTP header field or a universal resource locator (URL) parameter included in the request. Example 15 can include, or can optionally be combined with the subject matter of one or any combination of Examples 1-15 to include, subject matter (such as a method, means for performing acts, or a machine-readable medium including instruction that, when performed by the machine cause the machine to perform acts) for securely accessing a portable electronic device from an auxiliary device comprising transmitting an authentication token to the auxiliary device, transmitting a script element to the auxiliary device, the script element configured to copy the token from a first location in a request originating from the auxiliary device to a second location in the request, the first location and second location being different receiving the request, the request including identification of a resource, and authenticating the request. Wherein authenticating includes searching the first location for the authentication token, and searching the second location for the authentication token.

In Example 16, the subject matter of Example 15 can optionally include sending a login request to the auxiliary device for information to unlock the portable electronic device, and receiving login information from the auxiliary device to unlock the portable electronic device, wherein the authentication token is sent in response to login information that successfully unlocks the portable electronic device.

In Example 17, the subject matter of Example 16 can optionally include, wherein the login information includes a password for the portable electronic device.

In Example 18, the subject matter of one or any combination of Examples 16-17 can optionally include wherein the request comprises a hypertext transfer protocol (HTTP) request, wherein the first location is an HTTP request header field named Cookie, and wherein the second location is at least one of a custom HTTP request header field or a universal resource locator (URL) parameter.

Example 19 can include, or can optionally be combined with the subject matter of one or any combination of Examples 1-18 to include, subject matter (such as a portable electronic device, apparatus, or system), configured to be communicatively coupled with an auxiliary device, comprising a processor configured to transmit an authentication token to the auxiliary device, transmit a script element to the auxiliary device, the script element configured to copy the token from a first location in a request originating from the auxiliary device to a second location in the request, the first location and second location being different, receive the request, the request including identification of a resource on the portable electronic device, and authenticate the request. Wherein to authenticate includes searching the first location for the authentication token, and searching the second location for the authentication token.

In Example 20, the subject matter of Example 19 can optionally include, wherein the processor is configured to send a request to the auxiliary device for login information to unlock the portable electronic device, and receive login information from the auxiliary device to unlock the portable electronic device, wherein the authentication token is sent in response to login information that successfully unlocks the portable electronic device.

These non-limiting examples can be combined in any permutation or combination.

The above detailed description includes references to the accompanying drawings, which form a part of the detailed description. The drawings show, by way of illustration, specific embodiments in which the subject matter herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the subject matter should be determined with reference to the appended claims, along with the full scope of equivalents to which such claims are entitled.

What is claimed is:

1. A remote device configured to be communicatively coupled with an auxiliary device, the remote device comprising a processor configured to:
   receive a remote device resource request from the auxiliary device;
   search a first location of the request for a first authentication result;
   search a second location of the request for a second authentication result, the first location and the second location being different; and
   grant the auxiliary device access to the remote device resource in response to the first authentication result, the second authentication result, and an auxiliary authentication token from a plurality of authentication tokens on the auxiliary device, matching each other.

2. The remote device of claim 1, the processor further configured to:
   transmit an authentication token to the remote device; and
   transmit a script element to the remote device, the script element configured to copy the authentication token from the first location to the second location.

3. The remote device of claim 2, the processor further configured to:
   send a login request to the remote device for information to unlock the remote device; and
   receive login information from the remote device to unlock the remote device, wherein the authentication token is sent in response to login information that successfully unlocks the remote device.

4. The remote device of claim 1, wherein the first location is in a cookie sent with the request, the request comprising a hypertext transfer protocol (HTTP) request, and the cookie being in an HTTP request header field named Cookie.

5. The remote device of claim 1, wherein the second location is in a custom HTTP header field.

6. The remote device of claim 1, wherein the second location is in a universal resource locator (URL) parameter included in the request.

7. The remote device of claim 1, wherein the second authentication result is a copy of the first authentication result.

8. A method for securely authenticating a request for a remote device resource from an auxiliary device, the method comprising:
   searching a first location of the request for a first authentication result;
   searching a second location of the request for a second authentication result, the first location and the second location being different; and
   granting the auxiliary device access to the remote device resource in response to the first authentication result, the second authentication result, and an auxiliary token from a plurality of tokens on the auxiliary device, matching each other.

9. The method of claim 8, further comprising:
   transmitting an authentication token to the remote device; and
   transmitting a script element to the remote device, the script element configured to copy the authentication token from the first location to the second location.

10. The method of claim 9, further comprising:
    sending a login request to the remote device for information to unlock the remote device; and
    receiving login information from the remote device to unlock the remote device, wherein the authentication token is sent in response to login information that successfully unlocks the remote device.

11. The method of claim 8, wherein the first location is in a cookie sent with the request, the request comprising a hypertext transfer protocol (HTTP) request, and the cookie being in an HTTP request header field named Cookie.

12. The method of claim 8, wherein the second location is in a custom HTTP header field.

13. The method of claim 8, wherein the second location is in a universal resource locator (URL) parameter included in the request.

14. The method of claim 8, wherein the second authentication result is a copy of the first authentication result.

15. A non-transitory computer readable medium including instructions, when executed by a processor included in a remote device, that cause the processor to perform operations comprising:
    receiving a request for a resource of the remote device;
    searching a first location of the request for a first authentication result;
    searching a second location of the request for a second authentication result, the first location and the second location being different; and
    granting an auxiliary device access to the resource in response to the first authentication result, the second authentication result, and an auxiliary token from a plurality of tokens on the auxiliary device, matching each other.

16. The non-transitory computer readable medium of claim 15, wherein the instructions cause the processor to perform further operations comprising:
    transmitting an authentication token to the remote device; and
    transmitting a script element to the remote device, the script element configured to copy the authentication token from the first location to the second location.

17. The non-transitory computer readable medium of claim 16, wherein the instructions cause the processor to perform further operations comprising:
    sending a login request to the remote device for information to unlock the remote device; and
    receiving login information from the remote device to unlock the remote device, wherein the authentication token is sent in response to login information that successfully unlocks the remote device.

18. The non-transitory computer readable medium of claim 15, wherein the first location is in a cookie sent with the request, the request comprising a hypertext transfer protocol (HTTP) request, and the cookie being in an HTTP request header field named Cookie.

19. The non-transitory computer readable medium of claim 15, wherein the second location is in a custom HTTP header field.

20. The non-transitory computer readable medium of claim 15, wherein the second location is in a universal resource locator (URL) parameter included in the request.

* * * * *